(No Model.) 2 Sheets—Sheet 1.

J. O. BEAZLEY.
RETORT VAPORIZER.

No. 532,018. Patented Jan. 8, 1895.

Witnesses
Inventor
his Attorney (No Model.) 2 Sheets—Sheet 2.
J. O. BEAZLEY.
RETORT VAPORIZER.
No. 532,018. Patented Jan. 8, 1895.
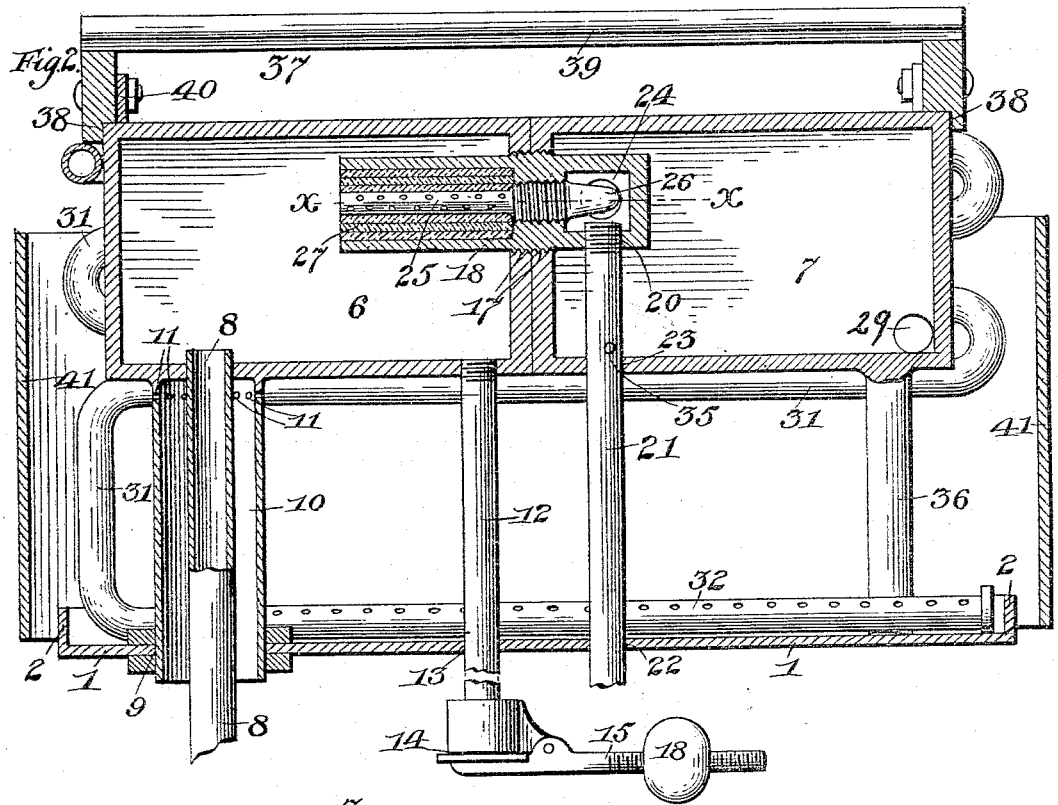
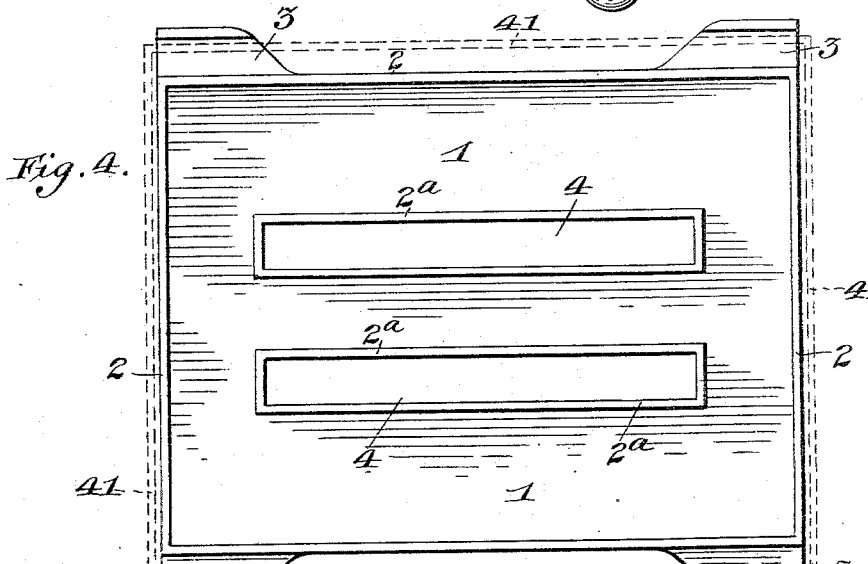
Witnesses  Inventor
Joseph O. Beazley
his Attorney

UNITED STATES PATENT OFFICE.

JOSEPH O. BEAZLEY, OF BALTIMORE, MARYLAND, ASSIGNOR TO WILLIAM F. BEASLEY, TRUSTEE, OF SAME PLACE.

RETORT-VAPORIZER.

SPECIFICATION forming part of Letters Patent No. 532,018, dated January 8, 1895.

Application filed March 10, 1894. Serial No. 503,155. (No model.)

*To all whom it may concern:*

Be it known that I, JOSEPH O. BEAZLEY, a citizen of the United States, residing at Baltimore, in the State of Maryland, have invented certain new and useful Improvements in Retort-Vaporizers; and I do hereby declare the following to be a full, clear, and exact description of the invention, such as will enable others skilled in the art to which it appertains to make and use the same.

My invention relates to a device wherein the vapors of oil are to be united with the vapors of water or steam, and the resultant product burned to afford the heat necessary to form such vapors, and the heat which may be desired for any other purpose.

The invention consists, generally speaking, in certain improvements on the class to which my prior patent, No. 504,297, dated the 29th day of August, 1893, belongs, and has for its object to provide a device wherein a large body of oil and water may be vaporized and mixed, and which will have the advantages of the device embodied in my prior patent, namely: the vaporization of the oil without the deposit of carbon with its attending objections, a flame capable of easy regulation, and simplicity of construction and use.

With these objects in view, my invention therefore consists in the construction, arrangement, and combination of the several parts of which it is composed, as will be hereinafter more fully described and claimed.

Figure 1:
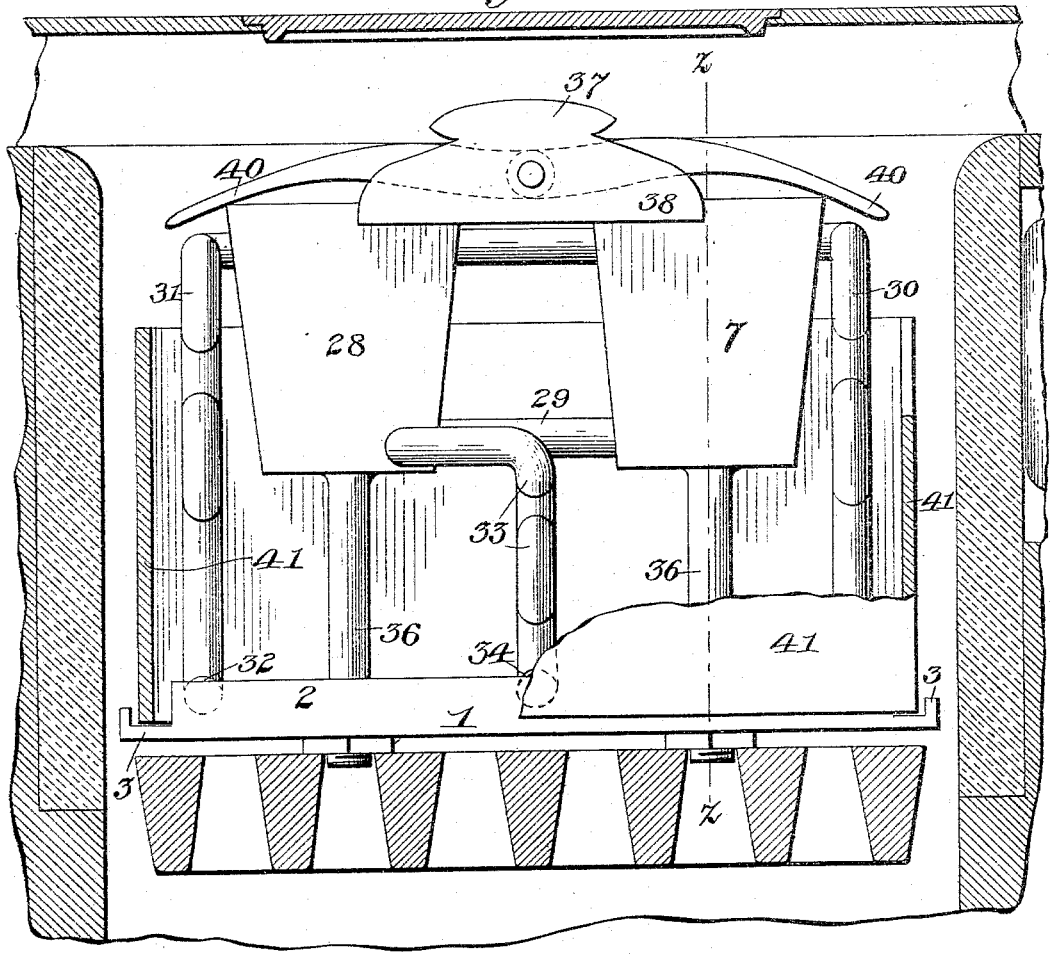
Figure 3:
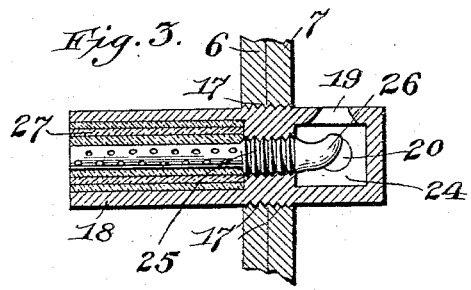

Referring to the accompanying drawings in which corresponding parts are designated by similar marks of reference, Figure 1 is an end elevation of my invention, as applied to a range. Fig. 2 is a longitudinal vertical section on line Z—Z, of Fig. 1. Fig. 3 is a horizontal longitudinal fragmental section on line X—X of Fig. 2. Fig. 4 is a plan view of the drip pan.

Although I have, in the accompanying drawings, shown my device as applied to a stove, and although I will so hereinafter describe it, it should be understood that it is applicable to any purpose in which heat is desired.

The drip pan 1 has the raised sides 2 and projecting ears 3, and is by preference of such a size as to fit snugly within the fire box of the stove, upon the grate of which it rests. A longitudinal slot 4 is formed in the bottom of the pan on each side of the center, each of the said slots being protected by raised edges $2^a$, and extending from the central portion of the pan toward the ends but not to them.

The water and oil vaporizing chambers 6 and 7, respectively, are supported above the drip pan, and to one side of the center thereof, the said chambers being secured together by the drier and injector, hereinafter described. The water to be vaporized passes into the chamber 6 by means of a pipe 8, which is inserted through an aperture 9 in the bottom of the drip pan, the upper end of the said pipe projecting into the bottom of the water chamber, and extending upwardly a small distance therein. In order to prevent the vaporization of water in the said pipe, and the consequent deposit of solid matter held in suspension therein, it is surrounded by a collar 10, cast with the water chamber and secured by a nut to the drip pan, and provided with a series of apertures 11 in its upper end, thereby causing a constant circulation of cold air drawn from below the grate through the said collar, while the burner is in operation.

A blow-out pipe 12 extends from the bottom of the chamber 6 through the aperture 13 in the drip pan to below the grate where it is provided with a valve 14 having a threaded arm 15 on which is mounted a weight 16, by changing the position of which upon the arm, the steam pressure within the chamber 6 may be regulated. This is desirable, as an excess of pressure within the chamber tends to blow the vapors from the burners with such force as to prevent their ignition until they have passed up into the chimney, and above the vaporizing chamber, while it is extremely difficult to regulate this pressure by means of the amount of water admitted to the chamber. The valve therefore provides a means whereby the excess of steam will be removed from the chamber from time to time, and the steam in passing out through the said blow-out pipe will carry with it the deposit from the vaporized water. As will be seen, the action of this valve is automatic, and it will, if the amount of water admitted to the chamber be properly regulated, be opened at short intervals of time, thus affording means whereby the deposit will be removed from the chamber, practically as soon as it is formed, and before it has time to solidify upon the walls thereof.

The oil vaporizing chamber 7 is mounted with its axis coincident with the prolongation of the axis of the water vaporizing chamber 6, corresponding threaded apertures being formed in their abutting end walls. A tube 18 having threads upon its periphery is screwed into the said apertures 17, it having its opposite ends projecting into the water vaporizing chamber 6, and the oil vaporizing chamber 7 and binding the two together. That end of the tube which projects into the water chamber 6 is open, while the end that projects into the oil chamber 7 is closed, the latter end, however, having an aperture 19 on its side, and a threaded hole 20 in its bottom, into which hole the upper end of the oil induction pipe 21, (which passes through the aperture 22 in the drip pan, and the aperture 23 in the chamber 7) is inserted, thus forming an oil chamber 24 in the said closed end of the tube 18. A pipe 25 is screwed into the interior of the tube 18, one end of the pipe being bent and formed into a nozzle 26, which is within the chamber 24 and opposite the aperture 19 in the wall thereof. The opposite end of the pipe 25 projects into that end of the tube 18 which is within the water chamber 6, and is perforated, it being surrounded by a scroll of asbestos cloth, which is contained within the last named end of the tube 18.

The steam generated within the chamber 6 will pass through the pipe 25, and out through the nozzle 26 with a force due to the pressure within the steam chamber, and will draw with it oil from the pipe 21, the latter being atomized and thrown against the heated side wall of the chamber 7. The steam in passing through perforated ends of the pipe 25 will be subjected to the absorbent action of the asbestos scroll 27, which will absorb the globules of water which may have escaped vaporization within the water chamber 6. In assembling these parts, I by preference screw the tube 18 into the aperture 17 in the end wall of the chamber 7, so that the aperture 20 within the said tube is in alignment with the hole 23 in the bottom of the chamber 7, when the oil induction pipe 21 may be screwed in place. The water chamber 6 is then screwed on to the projecting part of the tube 18, and the water induction pipe 8 and blow-out pipe 12 are screwed home.

A mixing chamber 28 is mounted above the drip pan upon the side opposite to the chambers 6 and 7, and by preference, has a length equal to the joint length of the said chambers, it being connected with the bottom of the oil vaporizing chamber 7 by a pipe 29. In this chamber 28, the mixed oil and steam are subjected to a further high temperature and pass by the pipes 30 and 31 down along the outer side of the chamber 28 and chambers 6 and 7, where the said pipes are reversed upon themselves and are there subjected to the heat resulting from the direct impact of the flames upon the pipes, to the burners 32 lying upon the upper surface of the drip pan, near each side thereof, the said burners consisting of perforated pipes connected with the lower ends of the pipes 30 and 31. As the pipes 30 and 31 are by preference connected with the top of the chamber 28, I connect a pipe 33 with the bottom of the said chamber 28, and having reversed it in a manner corresponding with the reversal of the pipes 30 and 31, provide at its lower end a burner 34, similar to the burner 32, but located above the drip pan, and between the slots 4 therein, the reversed portion of the pipe 33 being thus located above the burner 34, and below and between the mixing chamber 28 and the oil and steam chambers 6 and 7. In order to start the flame an aperture 35 is formed in the oil induction pipe 21 within the oil chamber 7 and near the bottom thereof, so that upon the admission of the oil through the said pipe, by means of any suitable cock (not shown) the oil will flow out of the said aperture along the bottom of the chamber 7 through the pipe 29, into the chamber 28, and thence through the pipe 33 and burner 34, (all the said parts being suitably inclined to admit this,) and out of the perforations in the said burner 34 on to the said drip pan, where the oil may be ignited. When the oil and steam vaporizing chambers become sufficiently heated by the flame of the burning oil, water may be admitted into the water chamber 6 through the water induction pipe 8 by means of a suitable cock, (not shown,) in which chamber the water will be converted into steam, and flowing into the oil chamber 7, through the aperture 19 in the tube 18, will draw with it oil from the pipe 21, as before described, the resultant mixture, passing through the pipe 29 into the mixing chamber 28. From this chamber the lighter parts of the gases will be removed by the pipes 30 and 31 to the burners 32, where they will be first ignited by the burning oil. The heavier parts of the gases will, however, flow through the pipe 33 to the burner 34, and will there burn, the air necessary to support combustion of the gases issuing from the said burner coming up through the slot 4 in the drip pan, and this air will also feed the inner sides of the sheets of flame issuing from the burners 32. By this construction the outer as well as the inner sides of the chambers 6 and 7 and 28 will be heated. As will be seen the chamber 6 may be supported above the drip pan by means of the collar 10, and I prefer to support the chambers 7 and 28 by legs 35.

A deflector 37 has shoulders 38 upon its ends, resting upon the tops of the chambers 6 and 7 and 28, the longitudinal connecting member 39, of the deflector being above and between the said chambers, thus preventing the flame issuing from the central burner 34 from direct impact on the lids of the stove. Hinged wings 40 are pivoted to the ends of the said deflector 38, and resting on the outer edges of the chambers, and projecting from the sides thereof, serve to spread the flame of the side burners 32.

A jacket 41 rests upon the ears 3 beyond the raised sides 2 of the drip pan, between which sides and the bottom of the jacket air to support combustion enters, the jacket extending upwardly a sufficient distance to so confine the side flames as to cause them to impinge upon the chambers. If desired that side of the jacket which is adjacent to the water back may be cut away at its upper edge in order to facilitate the heating of the latter.

I may also, if I desire, provide a blow-out pipe 45, provided with a cock 46 to remove any sediment that may be deposited within the oil vaporizing chamber, the pressure from the steam within the chamber being sufficient to accomplish this.

It is obvious that in order to cause the water and oil to enter their respective vaporizing chambers 6 and 7 against the pressure of the vapor therein, they must be under pressure, and I may use for this purpose either the pressure due to a head of water or oil, or due to the action of a pump. It will also be seen that if water be passed into the water vaporizing chamber faster than it is vaporized therein, the excess of water will flow into the blow-out pipe and escape through the automatic valve thereof, thus preventing the water from flowing into the oil vaporizing chamber and other parts of the burner, and clogging them, as occurs in all burners in which means are not provided for removing the excess of water. Indeed, in a burner constructed according to this invention there is at no time any accumulation of water, the water flowing in from the intake pipe 8, falling upon the heated bottom of the water vaporizing chamber, and being either instantly vaporized, or flowing into the blow out pipe, from which it is discharged, and I will in the following claims denote a vaporizing chamber in which such instantaneous vaporization occurs by the title of a "flasher," and I wish it to be understood that the details of construction specified above may be departed from to a greater or less extent, without departing from the scope of my invention.

Having thus described my invention, what I claim, and desire to secure by Letters Patent of the United States, is—

1. In a hydrocarbon burner, wherein water is converted into steam to unite with the vapor of oil; the combination of a water vaporizing chamber, an outlet pipe leading from the bottom of the said chamber, and an automatic relief valve on the said outlet pipe, actuated by the pressure within the said outlet pipe, substantially as described.

2. In a hydrocarbon burner, wherein the water is converted into steam to unite with the vapor of oil, the combination with a water vaporizing chamber and an oil vaporizing chamber, having threaded apertures in their adjoining walls, a tube inserted in the said apertures, and connecting the said chambers, a perforated pipe contained in the said tube, asbestos contained in the said tube and surrounding the said pipe, burners connected to the said oil vaporizing chamber, an oil induction pipe entering the said oil vaporizing chamber, and a water induction pipe entering the said water vaporizing chamber, substantially as described.

3. In a hydrocarbon burner, wherein water is converted into steam to unite with the vapor of oil, the combination with the oil vaporizer and burner, of a flasher connected with the vaporizer, substantially as described.

In testimony whereof I affix my signature in presence of two witnesses.

JOSEPH O. BEAZLEY.

Witnesses:
VERNON M. DORSEY,
PETER HOOE.